United States Patent
Tamai

(10) Patent No.: US 12,509,585 B2
(45) Date of Patent: Dec. 30, 2025

(54) THERMAL CONDUCTIVE SILICONE COMPOSITION

(71) Applicant: DuPont Toray Specialty Materials Kabushiki Kaisha, Tokyo (JP)

(72) Inventor: Tomohiro Tamai, Chiba (JP)

(73) Assignee: Dupont Toray Specialty Materials Kabushiki Kaisha, Tokyo (JP)

( * ) Notice: Subject to any disclaimer, the term of this patent is extended or adjusted under 35 U.S.C. 154(b) by 594 days.

(21) Appl. No.: 18/046,777

(22) Filed: Oct. 14, 2022

(65) Prior Publication Data

US 2023/0159755 A1    May 25, 2023

(30) Foreign Application Priority Data

Oct. 21, 2021   (JP) .................................. 2021-172733

(51) Int. Cl.
| | | |
|---|---|---|
| C08L 83/04 | (2006.01) | |
| C08K 3/22 | (2006.01) | |
| C08K 3/36 | (2006.01) | |
| C09K 5/14 | (2006.01) | |

(52) U.S. Cl.
CPC ................ C08L 83/04 (2013.01); C08K 3/36 (2013.01); C09K 5/14 (2013.01); C08K 3/22 (2013.01); C08K 2003/2227 (2013.01); C08K 2201/001 (2013.01); C08K 2201/005 (2013.01)

(58) Field of Classification Search
None
See application file for complete search history.

(56) References Cited

U.S. PATENT DOCUMENTS

2021/0079221 A1*   3/2021   Toya ..................... C08K 3/08

FOREIGN PATENT DOCUMENTS

| JP | 8-257484 | A | 10/1996 |
|---|---|---|---|
| JP | 2001-139815 | A | 5/2001 |
| JP | 2005325211 | A | 11/2005 |
| JP | 2014-166930 | A | 9/2014 |
| JP | 6590445 | B2 | 3/2016 |
| JP | 2017-106030 | A | 6/2017 |
| JP | 2017513967 | A | 6/2017 |
| JP | 2018-53260 | A | 4/2018 |
| JP | 2018131583 | A | 8/2018 |
| JP | 2018-150493 | A | 9/2018 |
| JP | 2019-19227 | A | 2/2019 |
| JP | 2019-210305 | A | 12/2019 |
| JP | 2020-530502 | A | 10/2020 |
| JP | 2021001239 | A | 1/2021 |
| WO | 2018139506 | A1 | 8/2018 |
| WO | 2019003995 | A1 | 1/2019 |

* cited by examiner

*Primary Examiner* — Robert T Butcher
(74) *Attorney, Agent, or Firm* — Ingrassia Fisher & Lorenz, LLP | IF&L

(57) ABSTRACT

A thermally conductive silicone composition with good workability in a pin transfer process, and with which the cured product obtained has high adhesive strength and high heat dissipation. The composition includes (A) a straight-chain organopolysiloxane having at least two silicon atom-bonded alkenyl groups per molecule; (B) an organopolysiloxane resin; (C) organohydrogenpolysiloxane; (D) a heat dissipating filler powder mixture of a first collection of heat dissipating filler powder having an average particle size of no less than 0.2 μm but less than 1 μm and a second collection of heat dissipating filler powder having an average particle size of no less than 2 μm but less than 20 μm (at a mass ratio 3:7 to 2:8); (E) silica particles having an average primary particle size of less than 1 μm; and (F) a straight-chain organopolysiloxane having a silicon atom-bonded alkoxy group at one or both ends of the molecular chain.

5 Claims, No Drawings

THERMAL CONDUCTIVE SILICONE COMPOSITION

CROSS-REFERENCE TO RELATED APPLICATIONS

This application claims priority pursuant to 35 U.S.C. 119(a) to Japanese Application No. 2021-172733, filed Oct. 21, 2021, which application is incorporated herein by reference in its entirety.

TECHNICAL FIELD

The present disclosure relates to a thermally conductive silicone composition, and more particularly to a thermally conductive silicone composition for use in a pin transfer process.

BACKGROUND ART

With increasing LED outputs in recent years, there has been a need for techniques for efficiently dissipating heat from LED chips. There is also a need for die-bonding materials that come into direct contact with LED chips to have, not only high strength in adhering the chip to the substrate and high light extraction through the die-bonding material, but also high thermal conductivity. Normally, a material resulting from filling silicone with a heat dissipating filler, which has high thermal conductivity, is used as a die-bonding material, in order to ensure high heat dissipation (Patent Document 1: JP 2019-19227 A). Further, there is need for this die-bonding material to be usable in the same manner as an ordinary die-bonding materials for LEDs (Patent Document 3: JP 2020-530502 A), with this being used in a conventional pin transfer process (also known as a stamping process) (Patent Document 2: JP 8-257484 A).

In view of the balance between heat dissipation, price, and stability, alumina particles have been extensively studied for heat dissipating fillers. Among these, it is known that α-alumina, which has particularly high thermal conductivity, can achieve high heat dissipation (Patent Document 4: JP 2019-210305 A, Patent Document 5: JP 2018-53260 A). Furthermore, a curable polysiloxane composition including quartz powder as a thermally conductive filler is also known (Patent Document 6: JP 2017-106030 A). Further, a resin composition including a filler in which fine silica particles are adsorbed on the surface of boron nitride powder is also known (Patent Document 7: JP 2014-166930 A).

However, as the amount of the heat dissipating filler in the die-bonding material increases, the viscosity of the die-bonding material greatly increases, due to the cohesive force of the heat dissipating filler. Therefore, a surface treatment agent is usually also used for the heat dissipating filler in the die bonding material (Patent Document 8: JP 2001-139815 A, Patent Document 9: JP 6590445 B, Patent Document 10: JP 2018-150493 A). If an amount of surface treatment agent sufficient to reduce the viscosity of the die-bonding material was added, the thixotropy of the die-bonding material was, at the same time, reduced such that a problem arose in which, after the chip had been mounted on the substrate, the chip floated on the liquid die-bonding material and shifted.

Further, it has become clear that, when a die-bonding material with an increased amount of heat dissipating filler is used in a conventional pin transfer process, there is a problem in that the cohesive force, not only of the polymer, but also between the heat dissipating filler particles is applied, such that pronounced stringing tends to occur, and thus the workability is inferior. Here, in order to prevent stringing, attempts were made to solve this problem by using a polymer with a relatively low molecular weight. However, in this case, a new problem arose in that the cured polymer was brittle and had low strength, and in that high adhesive strength could not be obtained.

PRIOR ART DOCUMENTS

[Patent Document 1] JP 2019-19227 A
[Patent Document 2] JP 8-257484 A
[Patent Document 3] JP 2020-530502 A
[Patent Document 4] JP 2019-210305 A
[Patent Document 5] JP 2018-53260 A
[Patent Document 6] JP 2017-106030 A
[Patent Document 7] JP 2014-166930 A
[Patent Document 8] JP 2001-139815 A
[Patent Document 9] JP 6590445 B
[Patent Document 10] JP 2018-150493 A

SUMMARY OF THE INVENTION

Problems to be Solved by the Invention

Accordingly, an object of the present invention is to provide a thermally conductive silicone composition which has good workability in pin transfer processes and with which the cured product obtained has high adhesive strength and high heat dissipation.

Means for Solving the Problems

In light of the problems described above, as a result of intensive study, the present inventors found that the problem of stringing in the pin transfer process can be prevented by using a polymer with a low molecular weight, and the object of the present invention can be achieved, without loss of adhesive strength, by ensuring the strength after curing by way of using an organopolysiloxane resin and silica particles, and without impairing the heat dissipation, by optimizing the size and concentration of the silica particles according to the particle size of the thermally conductive filler.

In order to solve the aforementioned problem, one embodiment of the present invention provides the following thermally conductive silicone composition:

[1] A thermally conductive silicone composition comprising the following components (A) to (F):
a straight-chain organopolysiloxane having at least two silicon atom-bonded alkenyl groups per molecule, not having a silicon atom-bonded alkoxy group, and having a number average molecular weight of no greater than 10,000, in an amount of 50 to 90 parts by mass with respect to a total of 100 parts by mass of components (A) and (B);
an organopolysiloxane resin represented by the following formula (I)

$$(R^2{}_3SiO_{1/2})_l(R^1R^2{}_2SiO_{1/2})_m(R^1R^2SiO)_n(R^2{}_2SiO)_p \\ (R^1SiO_{3/2})_q(R^2SiO_{3/2})_r(SiO_{4/2})_s \qquad (I)$$

(wherein $R^1$ independently represents an alkenyl group and $R^2$ independently represents an unsubstituted or substituted monovalent hydrocarbon group that does not include an addition-reactive carbon-carbon double bond, provided that at least 80 mol % of all the $R^2$ are methyl groups and l, m, n, p, q, r, and s are respectively numbers satisfying l≥0, m≥0, n≥0, p≥0, q≥0, r≥0, and s≥0, wherein m+n+q>0, q+r+s>0, and l+m+n+p+q+r+s=1 is satisfied, in an amount of 10 to 50 parts by mass with respect to a total of 100 parts by mass of components (A) and (B);

(C) an organohydrogenpolysiloxane having at least two silicon atom-bonded hydrogen atoms per molecule and a number average molecular weight of no greater than 10,000, in an amount such that the number of silicon atom-bonded hydrogen atoms in component (C) is 0.1 to 15 moles with respect to a total of 1 mole of the silicon atom-bonded alkenyl groups in component (A) and the silicon atom-bonded alkenyl groups in component (B);

(D) a heat dissipating filler, said heat dissipating filler being a heat dissipating filler mixture of a first collection of heat dissipating filler powder having an average particle size of no less than 0.2 μm but less than 1 μm, and a second collection of heat dissipating filler powder having an average particle size of no less than 2 μm but less than 20 μm, wherein the mass ratio of the first collection of heat dissipating filler powder to the second collection of heat dissipating filler powder is 3:7 to 2:8, in an amount of 70.0 mass % or more, as based on the total mass of the thermally conductive silicone composition;

(E) silica particles wherein the primary particles have an average particle size of less than 1 μm, in an amount of 0.1 to 3 mass %, as based on the total mass of the thermally conductive silicone composition; and (F) a straight-chain organopolysiloxane having a silicon atom-bonded alkoxy group at one or both ends of the molecular chain, in an amount of 0.5 to 20 parts by mass with respect to a total of 100 parts by mass of component (A) and component (B).

In one embodiment of the present invention, the $D_{10}$ of the heat dissipating filler powder having an average particle size of no less than 0.2 μm but less than 1 μm is greater than the $D_{90}$ of the primary particles of the silica particles. In this embodiment, thixotropy can be increased without impeding thermal conductivity. Therefore, even after the chip is placed on the liquid die-bonding material in the pin transfer process, the chip is fixed without moving, so that both higher positional accuracy and thermal conductivity can be achieved.

In one embodiment of the present invention, the heat dissipating filler consists of α-alumina particles. In this embodiment, higher heat dissipation can be achieved.

In one embodiment of the present invention, the thermally conductive silicone composition has a viscosity of no greater than 20 Pa·s at a temperature of 25° C. and a rotational speed of 10 s$^{-1}$. In this embodiment, stringing of the thermally conductive silicone composition in the pin transfer process can be better suppressed.

One embodiment of the present invention provides a thermally conductive silicone composition for use in a pin transfer process.

Effects of the Invention

The thermally conductive silicone composition in one embodiment of the present invention produces an effect of good workability in a pin transfer process, and an effect of the cured product of the thermally conductive silicone composition having high adhesive strength and high heat dissipation.

MODES FOR CARRYING OUT THE INVENTION

The (A) component and (B) component of the thermally conductive silicone composition of the present invention are the base resins (base polymers) of the thermally conductive silicone composition. Component (A) is a straight-chain organopolysiloxane having at least two silicon atom-bonded alkenyl groups per molecule, not having a silicon atom-bonded alkoxy group, and having a number average molecular weight of no greater than 10,000. In one embodiment of the present invention, the amount of component (A) included in the thermally conductive composition is 50 to 90 parts by mass, preferably 60 to 80 parts by mass, more preferably 65 to 75 parts by mass, with respect to a total of 100 parts by mass of component (A) and component (B).

The alkenyl group in component (A) is exemplified by alkenyl groups having 2 to 12 carbons, such as a vinyl group, allyl group, butenyl group, pentenyl group, hexenyl group, heptenyl group, octenyl group, nonenyl group, decenyl group, undecenyl group, or dodecenyl group, and is preferably a vinyl group. Furthermore, in component (A), examples of groups other than alkenyl groups that are bonded to a silicon atom include: alkyl groups having 1 to 12 carbons such a methyl group, ethyl group, propyl group, isopropyl group, butyl group, isobutyl group, tert-butyl group, pentyl group, neopentyl group, hexyl group, cyclohexyl group, heptyl group, octyl group, nonyl group, decyl group, undecyl group, or dodecyl group; aryl groups having 6 to 12 carbons such as a phenyl group, tolyl group, xylyl group, or naphthyl group; and aralkyl groups having 7 to 12 carbons such as a benzyl group, phenethyl group, or phenylpropyl group; as well as groups in which some or all of the hydrogen atoms in these groups are substituted with a halogen atom such as a fluorine atom, chlorine atom, or bromine atom.

The component (A) organopolysiloxane may have silicon atom-bonded alkenyl groups only at the two ends of the molecule, may have silicon atom-bonded alkenyl groups only in diorganosiloxane repeating units of the molecule, or may have silicon atom-bonded alkenyl groups both at the ends of the molecule and in the diorganosiloxane repeating units. Examples of component (A) include dimethylpolysiloxane capped with dimethylvinylsiloxy groups at both ends of the molecular chain, dimethylsiloxane-methylphenylsiloxane copolymer capped with dimethylvinylsiloxy groups at both ends of the molecular chain, dimethylsiloxane-methylvinylsiloxane copolymer capped with dimethylvinylsiloxy groups at both ends of the molecular chain, methylphenylpolysiloxane capped with dimethylvinylsiloxy groups at both ends of the molecular chain, dimethylsiloxane-methylvinylsiloxane copolymer capped with trimethylsiloxy groups at both ends of the molecular chain, dimethylsiloxane-methylvinylsiloxane-methylphenylsiloxane copolymer capped with trimethylsiloxy groups at both ends of the molecular chain, and mixtures of two or more thereof. In one embodiment, component (A) can be a dimethylpolysiloxane capped with dimethylvinylsiloxy groups at both ends of the molecular chain. The (A) component may be used in the form of one type alone, or two or more types may be used together.

In one embodiment of the present invention, the component (A) organopolysiloxane has a number average molecular weight of no greater than 10,000, preferably no greater than 9,000, and more preferably no greater than 8,000. In one embodiment of the present invention, the organopolysiloxane of component (A) preferably has a number average molecular weight of at least 1,000, and more preferably has a number average molecular weight of at least 3,000. In the present specification, number average molecular weight (Mn) and weight average molecular weight (Mw) are values calculated for standard polystyrene measured by gel permeation chromatography.

The viscosity of component (A) is not particularly limited but, from the viewpoint of good handling workability of the composition, the viscosity of component (A) at 25° C. is preferably in the range of 20 to 2000 mPa·s, and more preferably in the range of 500 to 1500 mPa·s.

Component (B) of the thermally conductive silicone composition of the present invention is an organopolysiloxane resin represented by formula (I) below.

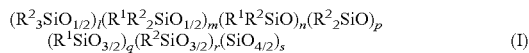

(I)

wherein $R^1$ independently represents an alkenyl group and $R^2$ independently represents an unsubstituted or substituted monovalent hydrocarbon group that does not include an addition-reactive carbon-carbon double bond, provided that at least 80 mol % of all the $R^2$ are methyl groups and l, m, n, p, q, r, and s are respectively numbers satisfying $l \geq 0$, $m \geq 0$, $n \geq 0$, $p \geq 0$, $q \geq 0$, $r \geq 0$, and $s \geq 0$, wherein $m+n+q>0$, $q+r+s \geq 0$, and $l+m+n+p+q+r+s=1$ is satisfied.

In formula (I), "l", "m", "n", "p", "q", "r" and "s" represent the molar ratios of the respective siloxane units. In formula (I) above, l, m, n, p, q, r, and s are respectively numbers satisfying $l \geq 0$, $m \geq 0$, $n \geq 0$, $p \geq 0$, $q \geq 0$, $r \geq 0$, and $s \geq 0$, wherein $m+n+q>0$, $q+r+s>0$, and $l+m+n+p+q+r+s=1$ is satisfied, and preferably l is a number from 0 to 0.65, m is a number from 0 to 0.65, n is a number from 0 to 0.5, p is a number from 0 to 0.5, q is a number from 0 to 0.8, r is a number from 0 to 0.8, and s is a number from 0 to 0.6. Furthermore, m+n+q is preferably a number from 0.1 to 0.8 and particularly preferably a number from 0.2 to 0.65, and q+r+s is preferably a number from 0.1 to 0.8 and particularly preferably a number from 0.2 to 0.6. More preferably, q+r+s is 0.3 or greater and, even more preferably, q+r+s is 0.4 or greater.

The number average molecular weight of the component (B) organopolysiloxane resin is preferably no greater than 6,000, more preferably no greater than 5,000, and even more preferably no greater than 4,000. The number average molecular weight of the component (B) organopolysiloxane resin is preferably 500 or more, more preferably 1,000 or more, and even more preferably 2,000 or more. The weight average molecular weight of the component (B) organopolysiloxane resin is preferably no greater than 8,000, more preferably no greater than 7,000, and even more preferably no greater than 6,000. The weight average molecular weight of the component (B) organopolysiloxane resin is preferably 1,000 or more, more preferably 2,000 or more, even more preferably 3,000 or more, and most preferably 5,000 or more. In one embodiment, the weight average molecular weight of the component (B) organopolysiloxane resin is preferably 5,000 to 6,000. The (B) component may used in the form of one type alone, or two or more types may be used together.

In one embodiment, component (B) can be an organopolysiloxane resin having a viscosity of 10,000 Pa·s or more and preferably 100,000 Pa·s or more, at 23° C., in the form of a gum that does not exhibit self-fluidity (a wax) or solid three-dimensional network.

In one embodiment, component (B) can be an MQ resin, which is an organopolysiloxane composed primarily of M units and Q units. Here, in formula (I), $(R^2{}_3SiO_{1/2})$ and $(R^1R^2{}_2SiO_{1/2})$ are M units and $(SiO_{4/2})$ is a Q unit. When component (B) is an MQ resin, in formula (I), preferably $0.9 \leq l+m+s \leq 1$, more preferably $l+m+s=1$; and preferably $0.5 \leq (l+m)/s \leq 1.6$, more preferably $0.6 \leq (l+m)/s \leq 1.4$, and still more preferably $0.7 \leq (l+m)/s \leq 1.3$.

In formula (I), multiple $R^1$ represent alkenyl groups which may be the same or different. In one embodiment, $R^1$ can preferably be an alkenyl group having 2 to 12 carbons, more preferably an alkenyl group having 2 to 10 carbons, and even more preferably an alkenyl group having 2 to 6 carbons. In one embodiment, $R^1$ alkenyl groups can be exemplified by a vinyl group, allyl group, butenyl group, pentenyl group, hexenyl group, heptenyl group, octenyl group, nonenyl group, decenyl group, undecenyl group, or dodecenyl group. In one embodiment, $R^1$ is a vinyl group.

In formula (I), a plurality of $R^2$, represent an unsubstituted or substituted monovalent hydrocarbon group that does not include an addition-reactive carbon-carbon double bond, and may be the same as, or different from, each other. In the present specification, the term "addition-reactive carbon-carbon double bond" refers to a carbon-carbon double bond capable of an addition reaction, for example a carbon-carbon double bond comprised by a vinyl group or an allyl group. In one embodiment, the unsubstituted or substituted monovalent hydrocarbon group that does not include an addition-reactive carbon-carbon double bond can preferably be a monovalent hydrocarbon group having 1 to 12 carbons, more preferably 1 to 10 carbons, and even more preferably 1 to 6 carbons, that does not contain an addition-reactive carbon-carbon double bond. Examples of the monovalent hydrocarbon group include: alkyl groups having 1 to 12 carbons such as a methyl group, ethyl group, propyl group, isopropyl group, butyl group, isobutyl group, tert-butyl group, pentyl group, neopentyl group, hexyl group, cyclohexyl group, heptyl group, octyl group, nonyl group, decyl group, undecyl group, or dodecyl group; aryl groups having 6 to 12 carbons such as a phenyl group, tolyl group, xylyl group, or naphthyl group; aralkyl groups having 7 to 12 carbons such as a benzyl group, phenethyl group, or phenylpropyl group; and groups in which some or all of the hydrogen atoms of these groups are substituted with a halogen atom such as a fluorine atom, a chlorine atom, or a bromine atom. In one embodiment, $R^2$ is a methyl group.

In formula (I), at least 80 mol % of all the $R^2$ are methyl groups. In one embodiment, in formula (I), preferably at least 90 mol % of all the $R^2$ are methyl groups, more preferably at least 95 mol % of all the $R^2$ are methyl groups.

In one embodiment of the present invention, the amount of component (B) included in the thermally conductive composition is 10 to 50 parts by mass, preferably 10 to 30 parts by mass, and more preferably 15 to 25 parts by mass, with respect to a total of 100 parts by mass of components (A) and (B).

Component (C) of the thermally conductive silicone composition of the present invention is an organohydrogenpolysiloxane having two or more silicon atom-bonded hydrogen atoms per molecule and a number average molecular weight of no greater than 10,000. Component (C) can function as a crosslinking agent for component (A) and component (B). The number average molecular weight of the component (C) organohydrogenpolysiloxane is preferably no greater than 9,000, more preferably no greater than 8,000, and even more preferably no greater than 4,000. In one embodiment of the present invention, the component (C) organohydrogenpolysiloxane preferably has a number average molecular weight of at least 1,000 and more preferably has a number average molecular weight of at least 3,000. In one embodiment, the component (C) organohydrogenpolysiloxane preferably has a number average molecular weight of 3,000 to 4,000.

There is no limitation on the bonding position of the hydrogen atoms bonded to the silicon atom in component (C), and this bonding position may be at the end of the molecular chain of the organohydrogenpolysiloxane, or may be in an organosiloxane repeating unit of the molecule, or may be both at the end of the molecular chain and in an organosiloxane repeating unit. The molecular structure of component (C) is not particularly limited, and may be, for example, a straight chain, a partially branched straight-chain, a branched chain, a cyclic structure, or a three-dimensional network structure. In one embodiment, the molecular structure of component (C) may be a straight-chain or a partially branched straight chain. The (C) component may be used in the form of one type alone, or two or more types may be used together. In one embodiment, component (C) does not include a silicon atom-bonded alkenyl group. In one embodiment, component (C) does not include a silicon atom-bonded alkoxy group.

The silicon atom-bonded organic groups included in component (C) are exemplified by alkyl groups having 1 to 12 carbons such as a methyl group, ethyl group, propyl group, butyl group, pentyl group, hexyl group, heptyl group, octyl group, nonyl group, decyl group, undecyl group, or a dodecyl group; aryl groups having 6 to 12 carbons such as a phenyl group, tolyl group, xylyl group, or naphthyl group; aralkyl groups having 7 to 12 carbons such as a benzyl group or a phenethyl group; as well as the aforementioned alkyl groups which are halogen-substituted, such as a 3-chloropropyl group or a 3,3,3-trifluoropropyl group; and a methyl group is preferred.

For example, component (C) is exemplified by methylhydrogenpolysiloxane capped with trimethylsiloxy groups at both ends of the molecular chain, dimethylsiloxane-methylhydrogensiloxane copolymer capped with trimethylsiloxy groups at both ends of the molecular chain, dimethylsiloxane/methylhydrogensiloxane/methylphenylsiloxane copolymer capped with trimethylsiloxy groups at both ends of the molecular chain, dimethylpolysiloxane capped with dimethylhydrogensiloxy groups at both ends of the molecular chain, dimethylsiloxane/methylphenylsiloxane copolymer capped with dimethylhydrogensiloxy groups at both ends of the molecular chain, methylphenylpolysiloxane capped with dimethylhydrogensiloxy groups at both ends of the molecular chain, cyclic methylhydrogenpolysiloxane, an organopolysiloxane copolymer comprising a siloxane unit represented by the formula: $R^3{}_3SiO_{1/2}$, a siloxane unit represented by the formula: $R^3{}_2HSiO_{1/2}$, and a siloxane unit represented by the formula: $SiO_{4/2}$, an organopolysiloxane copolymer comprising a siloxane unit represented by the formula: $R^3{}_2HSiO_{1/2}$ and a siloxane unit represented by the formula: $SiO_{4/2}$, an organopolysiloxane copolymer comprising a siloxane unit represented by the formula: $R^3HSiO_{2/2}$, a siloxane unit represented by the formula: $R^3SiO_{3/2}$, or a siloxane unit represented by the formula: $HSiO_{3/2}$, and mixtures of two or more of these organopolysiloxanes. In the formula, $R^3$ can be a group mentioned above as the "silicon atom-bonded organic group included in component (C).

In one embodiment of the present invention, the content of component (C) in the thermally conductive silicone composition of the present invention is such that, with respect to a total of 1 mole of the silicon atom-bonded alkenyl groups in component (A) and the silicon atom-bonded alkenyl groups in component (B), the amount of silicon atom-bonded hydrogen atoms in component (C) is preferably 0.1 to 15 moles, more preferably 0.5 to 10 moles, and still more preferably 1 to 7 moles.

In one embodiment of the present invention, [total number of moles of silicon atom-bonded hydrogen atoms]/[total number of moles of vinyl groups (wherein 1 mole of ethynyl groups in compounds included in the composition is added to the total number of moles of the vinyl group as 2 moles of vinyl groups)] in all of the components of the thermally conductive silicone composition of the present invention is preferably 0.1 to 10, more preferably 0.5 to 5, and even more preferably is 1 to 3.

Component (D) of the thermally conductive silicone composition of the present invention is a heat dissipating filler. A heat dissipating filler is a filler that can contribute to the thermal conductivity of the cured product of the thermally conductive silicone composition. In one embodiment of the present invention, component (D) is a heat dissipating filler mixture of a first collection of heat dissipating filler powder having an average particle size of no less than 0.2 μm but less than 1 μm, and a second collection of heat dissipating filler powder having an average particle size of no less than 2 μm but less than 20 μm, wherein the mass ratio of the first collection of heat dissipating filler powder having an average particle size of no less than 0.2 μm but less than 1 μm to the second collection of heat dissipating filler of the heat dissipating filler powder having an average particle size of no less than 2 μm but less than 20 μm is 3:7 to 2:8. By using a plurality of collections of heat dissipating filler powders with different average particle sizes, the filling efficiency of the heat dissipating filler powders in the thermally conductive silicone composition can be improved, the viscosity can be reduced, and the thermal conductivity can be improved.

In one embodiment of the present invention, the first collection of heat dissipating filler powder and the second collection of heat dissipating filler powder may be composed of the same chemical substance, or may these be composed of different chemical substances. In the present invention, the shape of the heat dissipating filler particles included in the heat dissipating filler powder is not particularly limited. When the heat dissipating filler particles are circular or spherical, increases in viscosity resulting from high contents of heat dissipating filler tend to be limited. Accordingly, it is preferable that the heat dissipating filler particles included in the heat dissipating filler powder are circular or spherical. In the present specification, the term "spherical" includes not only perfect spheres but also shapes with a circularity in the range of 0.8 to 1 when the particle is projected two-dimensionally. Circularity is (the perimeter of a circle having an area equal to the particle area)/(the length of the particle perimeter). In the present specification, the average particle size of component (D) refers to the average particle size of the primary particles of component (D).

In one embodiment of the present invention, the heat dissipating filler is a heat dissipating filler mixture of a first collection of heat dissipating filler powder having an average particle size of no less than 0.2 μm but less than 1 μm and a second collection of heat dissipating filler powder having an average particle size of no less than 2 μm but less than 20 μm. Preferably, the heat dissipating filler can be a heat dissipating filler mixture of a first collection of heat dissipating filler powder having an average particle size of 0.2 μm to 0.5 μm and a second collection of heat dissipating filler powder having an average particle size of 2 μm to 4 μm. In the present specification, the "first collection of heat dissipating filler powder" refers to the collection with the smaller average particle size of the two collections, and the "second collection of heat dissipating filler powder" refers to the collection with the larger average particle size.

In one embodiment of the present invention, the mass ratio of the first collection of heat dissipating filler powder having an average particle size of no less than 0.2 μm but less than 1 μm to the second collection of heat dissipating filler powder having an average particle size of no less than 2 μm but less than 20 μm is 2:8 to 3:7.

In the present specification, the average particle size can be found as the cumulative mass average value $D_{50}$ in particle size distribution measurement by laser light diffraction (and can also be referred to as the median size). In the present specification, $D_X$ is a particle size at which, in particle size distribution measurement by laser light diffraction, the cumulative frequency in the particle size distribution is X %. For example, $D_{10}$ is the particle size at which the cumulative frequency in the particle size distribution is 10%, and $D_{90}$ is the particle size at which the cumulative frequency in the particle size distribution is 90%.

In one embodiment of the present invention, the amount of heat dissipating filler serving as the component (D) is 70 mass % or more, as based on the total mass of the thermally conductive silicone composition. The amount of heat dissipating filler can preferably be 70 to 80 mass %, as based on the total mass of the thermally conductive silicone composition. In the present specification, "as based on the total mass of the thermally conductive silicone composition" means that the mass % of the heat dissipating filler is calculated based on the total mass of all of the components included in the thermally conductive silicone composition.

Any known heat dissipating filler can be used as the component (D) heat dissipating filler, so long as it does not oppose the object of the present invention. Materials constituting the heat dissipating filler may include, for example, the following materials: metals such as bismuth, lead, tin, antimony, indium, cadmium, zinc, silver, copper, nickel, aluminum, iron, and metallic silicon; alloys, such as alloys consisting of two or more metals selected from the group consisting of bismuth, lead, tin, antimony, indium, cadmium, zinc, silver, aluminum, iron, and metallic silicon; metal oxides such as aluminum oxide, zinc oxide, magnesium oxide, beryllium oxide, chromium oxide, and titanium oxide; metal hydroxides such as magnesium hydroxide, aluminum hydroxide, barium hydroxide, and calcium hydroxide; metal nitrides such as boron nitride, aluminum nitride, and silicon nitride; metal carbides such as silicon carbide, boron carbide, and titanium carbide; metal silicides such as magnesium silicide, titanium silicide, zirconium silicide, tantalum silicide, niobium silicide, chromium silicide, tungsten silicide, and molybdenum silicide; carbon, such as diamond, graphite, fullerenes, carbon nanotubes, graphene, activated carbon, and amorphous carbon black; soft magnetic alloys such as Fe—Si alloys, Fe—Al alloys, Fe—Si—Al alloys, Fe—Si—Cr alloys, Fe—Ni alloys, Fe—Ni—Co alloys, Fe—Ni—Mo alloys, Fe—Co alloys, Fe—Si—Al—Cr alloys, Fe—Si—B alloys, and Fe—Si—Co—B alloys; and ferrite, Mn—Zn ferrite, Mn—Mg—Zn ferrite, Mg—Cu—Zn ferrite, Ni—Zn ferrite, Ni—Cu—Zn ferrite, and Cu—Zn ferrite. Preferably, component (D) is a heat dissipating filler composed of a material selected from the group consisting of aluminum oxide, aluminum nitride, boron nitride, zinc oxide, magnesium oxide, aluminum, silver, and copper. More preferably, component (D) is a heat dissipating filler composed of α-alumina, such as α-alumina powder and α-alumina particles.

The (E) component of the thermally conductive silicone composition of the present invention consists of silica particles, the primary particles of which have an average size ($D_{50}$) of less than 1 μm. In one embodiment of the present invention, the average particle size of the primary particles of the silica particles is preferably no greater than 50 nm and more preferably no greater than 20 nm.

Any known silica particles can be used as the (E) component silica particles as long as they do not oppose the object of the present invention. For example, the component (E) silica particles may be fumed silica, quartz powder obtained by crushing a natural quartz starting material, and spherical silica particles obtained by melting quartz powder and then cooling and solidifying. The shape of the silica particles is also not particularly limited, and the silica particles may be crushed, spherical, or the like. Preferably, the silica particles are spherical. Furthermore, the surfaces of the component (E) silica particles may be treated with a surface treatment agent. Surface treatment agents for silica particles include organoalkoxysilane compounds such as polydimethylsiloxane (PDMS), organochlorosilane compounds such as dimethyldichlorosilane, organosilazane compounds such as hexamethyldisilazane (HMDS), and organic silicon compounds such as low molecular weight siloxane compounds, but are not limited thereto.

In one embodiment of the present invention, the $D_{10}$ of the heat first collection of heat dissipating filler powder, which is the collection with the smaller average particle size of the two collections, is greater than the $D_{90}$ of the primary particles of the silica particles.

In one embodiment of the present invention, the amount of component (E) in the thermally conductive silicone composition of the present invention is preferably less than 3 mass %, more preferably no greater than 2.5 mass %, and even more preferably no greater than 2.2 mass %, as based on the total mass of the thermally conductive silicone composition. In one embodiment of the present invention, the amount of component (E) in the thermally conductive silicone composition of the present invention is preferably 0.1 mass % or more, more preferably 0.5 mass % or more, and still more preferably 0.8 mass % or more, as based on the total mass of the thermally conductive silicone composition.

Component (F) of the thermally conductive silicone composition of the present invention is a surface treatment agent. By treating the surface of the heat dissipating filler with a surface treatment agent, the dispersibility of the heat dissipating filler in the composition can be improved, and the handleability and moldability of the composition can be further improved. In one embodiment of the present invention, the surface treatment agent is a straight-chain organopolysiloxane having a silicon atom-bonded alkoxy group at one end or both ends of the molecular chain. The straight-chain organopolysiloxane serving as component (F) preferably has a number average molecular weight of 2,000 to 7,000 and more preferably 3,000 to 5,000. The (F) component organopolysiloxane may have, or may not have, an alkenyl group bonded to a silicon atom. In one embodiment of the present invention, component (F) organopolysiloxane does not include a silicon atom-bonded alkenyl group.

For example, component (F) may include an organopolysiloxane that does not include an alkenyl group, represented by the following formula (II) disclosed in Patent Document 8 (JP 2001-139815 A):

where, in formula (II), $R^4$ is an alkyl group, preferably an alkyl group having 1 to 4 carbons, and $R^5$ is a monovalent hydrocarbon group, which in each case may be the same or different, a is an integer from 1 to 3, b is an integer from 1 to 3, and n is an integer of 0 or more and preferably an integer from 0 to 100.

In formula (II), $R^5$ is preferably, in each case, independently selected from the group consisting of: a straight-chain alkyl group such as a methyl group, ethyl group, propyl group, butyl group, hexyl group, decyl group, undecyl group, dodecyl group, tridecyl group, tetradecyl group, pentadecyl group, hexadecyl group, heptadecyl group, octadecyl group, nonadecyl group, or eicosyl group; a branched-chain alkyl group such as an isopropyl group, tertiary butyl group, isobutyl group, 2-methylundecyl group, or 1-hexylheptyl group; a cyclic alkyl group such as a cyclohexyl group or a cyclododecyl group; an aryl group such as a phenyl group, tolyl group, or xylyl group; or an aralkyl group such as a benzyl group, phenethyl group, or 2-(2,4,6-trimethylphenyl)propyl group. More preferably, $R^5$ in formula (II) can be, in each case, independently selected from straight-chain alkyl groups.

In one embodiment of the present invention, component (F) may include an organosiloxane represented by the following formula (III) disclosed in Patent Document 9 (JP 6590445 B).

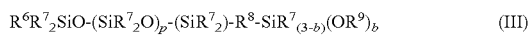

$$R^6R^7{}_2SiO\text{-}(SiR^7{}_2O)_p\text{-}(SiR^7{}_2)\text{-}R^8\text{-}SiR^7{}_{(3-b)}(OR^9)_b \quad (III)$$

In formula (III), $R^6$ is an unsubstituted or halogen-substituted monovalent hydrocarbon group, such as a straight-chain alkyl group, a branched alkyl group, a cyclic alkyl group, an alkenyl group, an aryl group, an aralkyl group, or a halogenated alkyl group; $R^7$ are monovalent hydrocarbon groups having no aliphatic unsaturated bonds, such as a straight-chain alkyl group, a branched-chain alkyl group, a cyclic alkyl group, an aryl group, an aralkyl group, or a halogenated alkyl group, which may be the same as, or different from, each other; $R^8$ is an oxygen atom or a divalent hydrocarbon group, such as an alkylene group such as an ethylene group, propylene group, butylene group, pentylene group, or hexylene group, or an alkylenearylenealkylene group such as an ethylenephenyleneethylene group or ethylenephenylenepropylene group; $R^9$ is an alkyl group, alkoxyalkyl group, alkenyl group, or acyl group; b is an integer from 1 to 3, and p is an integer of 1 or more and preferably from 1 to 200. In another embodiment, component (F) may be an organosiloxane represented by formula (III) above, wherein —$R^8$-$SiR^7{}_{(3-b)}(OR^9)_b$ is —O— divalent hydrocarbon group -$SiR^7{}_{(3-b)}(OR^9)_b$.

In one embodiment of the present invention, the component (F) may be a straight-chain organopolysiloxane having a silicon atom-bonded alkoxy group at both ends of the molecular chain, and having at least one silicon atom-bonded alkenyl group per molecule, disclosed in Patent Document 10 (JP 2018-150493 A), such as an organopolysiloxane represented by the following formula (IV).

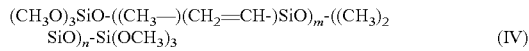

$$(CH_3O)_3SiO\text{-}((CH_3\text{—})(CH_2\text{=}CH\text{-})SiO)_m\text{-}((CH_3)_2SiO)_n\text{-}Si(OCH_3)_3 \quad (IV)$$

In the formula, m and n are positive numbers satisfying $1 \leq m \leq 50$ and $0 \leq n \leq 100$, respectively.

The amount of component (F) is not particularly limited, so long as this is an amount at which the properties of the surface treatment agent can be exhibited, but is preferably 0.5 parts to 20 parts by mass and more preferably 1 to 10 parts by mass, with respect to a total of 100 parts by mass of components (A) and (B).

In one embodiment of the present invention, the thermally conductive silicone composition may contain a platinum group metal-based catalyst. In the present specification, the platinum group metal-based catalyst is also referred to as component (G). The platinum group metal-based catalyst functions as a hydrosilylation reaction catalyst in order to promote curing of the thermally conductive silicone composition of the present invention. The platinum group metal-based catalyst may include one or more platinum group elements selected from the group consisting of platinum, rhodium, ruthenium, palladium, osmium and iridium. In one embodiment, the platinum group metal-based catalyst may be exemplified by a platinum-based catalyst, a rhodium-based catalyst, and a palladium-based catalyst. With a view to promoting curing of the thermally conductive silicone composition of the present invention, the platinum group metal-based catalyst is preferably a platinum-based catalyst. The platinum-based catalyst can be exemplified by fine platinum powder, chloroplatinic acid, alcohol solutions of chloroplatinic acid, platinum-alkenyl siloxane complexes, platinum-olefin complexes, and platinum-carbonyl complexes. Alkenyl siloxanes that are platinum-alkenyl siloxane complexes can be exemplified by 1,3-divinyl-1,1,3,3-tetramethyl disilane, 1,3,5,7-tetramethyl-1,3,5,7-tetravinyl cyclotetrasiloxane, alkenyl siloxanes in which some of the methyl groups of these alkenyl siloxanes are substituted with ethyl groups, phenyl groups, or the like, and alkenyl siloxanes in which the vinyl groups of these alkenyl siloxanes are substituted with allyl groups, hexenyl groups, or the like.

The content of the platinum group metal-based catalyst in the thermally conductive silicone composition of the present invention is not particularly limited so long as it is sufficient to carry out the hydrosilylation reaction of the composition (also referred to, in the present specification, as a catalytic amount). For example, in terms of the content of the platinum group metal-based catalyst in the thermally conductive silicone composition of the present invention, the platinum group metal element in the (G) component preferably constitutes an amount of 0.01 to 500 parts by mass, more preferably an amount of 0.05 to 100 parts by mass, and even more preferably an amount of 0.1 to 50 parts by mass, with respect to a total of 1,000,000 parts by mass of the (A) component, the (B) component, and the (C) component.

In one embodiment of the present invention, the thermally conductive silicone composition may contain a curing inhibitor. In the present specification, the curing inhibitor is also referred to as the (H) component. The curing inhibitor can be used to suitably control the curing rate of the thermally conductive silicone composition of the present invention. The curing inhibitor can be exemplified by: silylated acetylene compounds such as methyl-tris(3-methyl-1-butyne-3-oxy)silane, methylvinyl-bis(3-methyl-1-butyne-3-oxy)silane, and trimethyl(cyclohexyl-1-ethyne-1-oxy)silane; alkyne alcohols such as 1-ethynylcyclohexanol, 2-methyl-3-butyn-2-ol, 3,5-dimethyl-1-hexyn-3-ol, and 2-phenyl-3-butyn-2-ol; enyne compounds such as 3-methyl-3-penten-1-yne and 3,5-dimethyl-3-hexen-1-yne; alkenyl cyclic siloxane compounds such as 1,3,5,7-tetramethyl-1,3,5,7-tetravinylcyclotetrasiloxane and 1,3,5,7-tetramethyl-1,3,5,7-tetrahexenylcyclotetrasiloxane; and benzotriazole.

In one embodiment of the present invention, the amount of curing inhibitor in the thermally conductive silicone composition is not particularly limited, but this is preferably 0.05 to 7 mass %, more preferably 0.1 to 5 mass %, and still more preferably 0.5 to 3 mass %, as based on the total mass of the composition.

In one embodiment of the present invention, the thermally conductive silicone composition may further contain an adhesion imparting agent. In the present specification, the adhesion imparting agent is also referred to as component (J). The adhesion imparting agent can improve the adhesion of the cured product of the thermally conductive silicone composition to the substrate. Examples of adhesion imparting agents include: alkoxysilanes such as vinyltrimethoxysilane, allyltrimethoxysilane, allyltriethoxysilane, hydrogentriethoxysilane, 3-glycidoxypropyltrimethoxysilane, 3-glycidoxypropyltriethoxysilane, 2-(3,4-epoxycyclohexyl)ethyltrimethoxysilane, 3-methacryloxypropyltrimethoxysilane, and 3-methacryloxypropyltriethoxysilane; reaction mixtures of alkenyl group-containing diorganosiloxane oligomers capped with silanol groups at both ends of the molecular chain, such as dimethylsiloxane/methylvinylsiloxane copolymer oligomer capped with silanol groups at both ends of the molecular chain or methylvinylsiloxane oligomer with both end of the molecular chain capped with silanol groups, mixed with epoxy group-containing alkoxysilanes such as 3-glycidoxypropyltrimethoxysilane or 2-(3,4-epoxycyclohexyl)ethyltrimethoxysilane; reaction mixtures of the aforementioned alkenyl group-containing diorganosiloxane oligomers capped with silanol groups at both ends of the molecular chain mixed with 3-methacryloxypropyltrimethoxysilane; reaction mixtures of the aforementioned epoxy group-containing alkoxysilane mixed with 3-aminopropyltriethoxysilane; as well as tris(3-trimethoxysilylpropyl)isocyanurate. Preferably, the component (J) is a reaction mixture of an alkenyl group-containing diorganosiloxane oligomer capped with silanol groups at both ends of the molecular chain mixed with an epoxy group-containing alkoxysilane.

In one embodiment of the present invention, the content of the adhesion imparting agent in the thermally conductive silicone composition is not particularly limited but is preferably 0.1 to 10 parts by mass and more preferably 1 to 7 parts by mass, with respect to a total of 100 parts by mass of the (A) component, the (B) component, and the (C) component.

In addition to the aforementioned components, the thermally conductive silicone composition may contain optional components other than the aforementioned components within ranges in which the objects of the present invention are achieved. Examples of optional components may include pigments, dyes, fluorescent dyes, heat resistant additives, flame retardants such as triazole compounds, and plasticizers.

In one embodiment of the present invention, the viscosity of the thermally conductive silicone composition at a temperature of 25° C. and a rotational speed of 10 s$^{-1}$ is preferably no greater than 20 Pa·s, more preferably no greater than 16 Pa·s. In this embodiment, stringing of the thermally conductive silicone composition can be better prevented in the pin transfer process. Unless otherwise indicated, in the present specification, the viscosities of the thermally conductive silicone compositions are viscosities measured using a rotational viscometer (Anton Paar MCR 302, made by Anton Paar GmbH) at a given temperature and a given rotational speed.

In one embodiment of the present invention, the viscosity of the thermally conductive silicone composition at a temperature of 25° C. and a rotational speed of 1 s$^{-1}$ is preferably 8 Pa·s or more, more preferably 9 Pa·s or more, and even more preferably 10 Pa·s or more. In this embodiment, chip shifting can be further reduced when the chip is mounted on the thermally conductive silicone composition that has been pin-transferred onto the substrate.

In one embodiment of the present invention, the thermally conductive silicone composition preferably has a thixotropic index (TI) of 1.5 to 3.5 and more preferably 2.0 to 3.2. In the present specification, the thixotropic index (TI) is determined by the following formula:

TI=(viscosity of the thermally conductive silicone composition at a temperature of 25° C. and a rotational speed of 1 s$^{-1}$)/(viscosity of the thermally conductive silicone composition at a temperature of 25° C. and a rotational speed of 10 s$^{-1}$).

The method for producing the thermally conductive silicone composition of the present invention is not particularly limited. The thermally conductive silicone composition of the present invention can be produced according to conventional methods for producing silicone compositions including thermally conductive fillers. Known mixing/stirring devices such as kneaders, Ross mixers, Hobart mixers, dental mixers, and the like can be used when mixing the heat dissipating filler with other components such as the silicone component. In the production process, mixing of components (A), (B), (C), and the platinum group metal-based catalyst (component (G)) in the presence of a heat dissipating filler, which may cause a hydrosilylation reaction, is preferably performed while cooling. More preferably, cooling is performed so that the temperature of the composition will be a normal temperature. When the heat dissipating filler is treated with a surface treatment agent (component (F)), the heat dissipating filler that has previously been treated with a surface treatment agent may be mixed with other components including the component (A), or when the heat dissipating filler that has not been treated with a surface treatment agent is mixed with other components including component (A), this may be treated with a surface treatment agent at the same time. As one example, the thermally conductive silicone composition of the present invention can be produced by the series of steps of: adding components (A) and (B) to a kneader and stirring under nitrogen, adding the heat dissipating filler to the kneader and stirring; stirring for a certain period of time while heating (for example, 100° C. to 140° C.) under vacuum (for example, less than 10 mmHg); returning to normal pressure and, while cooling, optionally adding a curing inhibitor (component (H)) and stirring; adding component (C) to the kneader and stirring for a certain period of time while cooling at normal pressure; adding component (G) into the kneader and stirring at normal pressure while cooling for a certain period of time; continuing stirring under reduced pressure and cooling; then, after stirring is completed, returning to normal pressure, and recovering the resulting thermally conductive silicone composition.

The thermally conductive silicone composition of the present invention is suitable for use in a pin transfer process (which may also be referred to as a stamping process). The pin transfer process generally includes the following steps: a step of lowering a transfer pin from above a material reservoir so as to deposit the material on the tip of the transfer pin; a step of raising the transfer pin with the material deposited thereon, and moving the transfer pin with the material deposited thereon above a surface to be coated; a step of lowering the transfer pin toward the surface to be coated and depositing the material that was deposited on the transfer pin on the surface to be coated; and a step of raising the transfer pin after depositing the material on the surface to be coated, and moving the transfer pin over the material reservoir. In the pin transfer process, these steps can be repeated so as to deposit the material on multiple surfaces to be coated. When a conventional thermally conductive silicone composition with an increased amount of heat dissipating filler is used in the pin transfer process, it was found that, because the cohesive force, not only of the polymer, but also between the heat dissipating filler particles is applied, when the thermally conductive silicone composition is deposited on the surface to be coated, pronounced stringing of the thermally conductive silicone composition tends to occur.

For example, when a conventional thermally conductive silicone composition is deposited on a lead frame by way of the pin transfer process, a step of moving the transfer pin on which the conventional thermally conductive silicone composition is deposited horizontally above the lead frame, a step of lowering the transfer pin toward the lead frame, and a step of depositing the conventional thermally conductive silicone composition on the lead frame are performed. At this time, the conventional thermally conductive silicone composition deposited on the lead frame forms a first string of the conventional thermally conductive silicone composition in the direction in which the transfer pin moves horizontally. Subsequently, as a result of raising the transfer pin and starting to move the transfer pin toward the material reservoir, a second string of the conventional thermally conductive silicone composition is formed in the direction of movement of the transfer pin to the material reservoir. These strings cause the thermally conductive silicone composition to protrude from the position on the lead frame where the thermally conductive silicone composition should have been placed.

Conversely, when the thermally conductive silicone composition of the present invention is used in a pin transfer process, when the step of moving the transfer pin on which the thermally conductive silicone composition is deposited horizontally above the lead frame, the step of lowering the transfer pin toward the lead frame, and the step of depositing the thermally conductive silicone composition on the lead frame are performed, stringing of the thermally conductive silicone composition of the present invention is prevented or reduced. Next, stringing of the thermally conductive silicone composition of the present invention as a result of raising the transfer pin and moving the transfer pin toward the material reservoir is prevented or reduced. The thermally conductive silicone composition of the present invention that has been deposited on the lead frame can have an ideal stamping dot shape, and protrusions from the position on the lead frame where it should be placed are reduced or prevented.

The thermally conductive silicone composition of the present invention can be used, for example, as a die bond material for adhering an LED chip to a substrate. The cured product obtained by curing the thermally conductive silicone composition of the present invention that has been applied can efficiently transfer heat from a heat-generating member such as an LED to a heat dissipating member. The curing conditions for the thermally conductive silicone composition of the present invention are not particularly limited but, for example, curing is performed by way of heating at 50° C. to 200° C., preferably 100° C. to 180° C., and more preferably 120° C. to 150° C.

EXAMPLES

The thermally conductive silicone composition of the present invention will be described in detail with reference to the following examples, but the present invention is not limited to the description in the examples.

Various properties of the thermally conductive silicone compositions and cured products thereof in the examples and comparative examples were measured as follows.

VISCOSITY

The viscosity of thermally conductive silicone composition (unit: Pa·s) was measured using a rotational viscometer (Anton Paar MCR 302, made by Anton Paar GmbH) at 25° C., at a rotational speed of 1 $s^{-1}$ or 10 $s^{-1}$.

THIXOTROPIC INDEX (TI)

The thixotropic index was determined according to the following formula:

TI=(viscosity of the thermally conductive silicone composition at a temperature of 25° C. and a rotational speed of 1 $s^{-1}$)/(viscosity of the thermally conductive silicone composition at a temperature of 25° C. and a rotational speed of 10 $s^{-1}$).

ADHESIVE STRENGTH

Using a plane-type high-speed die bonder (HOSON GT100BH), the thermally conductive silicone compositions of the examples and comparative examples were transferred to a lead frame portion (PCT (polycarbonate hexane dimethanol terephthalate) of an LED package which was pre-baked at 160° C. for 1 hour) by a pin transfer process using a two-head pin. An LED chip (chip size 1025) was mounted on the transferred thermally conductive silicone composition. The cycle time for mounting one LED chip (element) and one die attach on the lead frame was 150 ms/cycle. The running time required to mount all the LED chips and die attaches on one lead frame was 15 hours. The prepared LED package was heated at 150° C. for 2 hours to cure the thermally conductive silicone composition, thereby obtaining an LED package. The strength of adhesion of the LED chip to the lead frame in the LED package obtained was measured by a bond tester Model SS-100KP made by Seishin Shoji Co., Ltd. A measured adhesive strength of 550 g/chip or more was a pass, and a measured adhesive strength of less than 550 g/chip was a fail.

STRINGING

With an LED package obtained by mounting an LED chip by the method described above, when the LED chip is viewed from above 15 hours after the transfer, protrusion of strings of the transferred thermally conductive silicone composition by less than 500 μm was a pass for stringing, and 500 μm or more was a fail for stringing.

CHIP DRIFT

With the LED package obtained by mounting an LED chip by the method described above, when the mounted LED chip is viewed from above, LED chip shifting such that protrusion strings of the transferred thermally conductive silicone composition is within 200 μm was a pass for chip drift and exceeding 200 μm was a fail for chip drift.

THERMAL CONDUCTIVITY

Measurement was performed using a 10 mm×60 mm×30 mm thermally conductive silicone composition that had been cured at 150° C. for 2 hours using the Hot Disk TPS 2500 S thermophysical property measuring device made by Kyoto Electronics Manufacturing Co., Ltd. A measured thermal conductivity value of 1.0 W/m·K or more was a pass, and less than 1.0 W/m·K was a fail.

The components used in the examples and comparative examples are as follows.

The following components were used for component (A).

Component (a1): Dimethylpolysiloxane capped with dimethylvinylsiloxy groups at both ends of the molecule (number average molecular weight (Mn)=8000) (mass fraction of vinyl groups per molecule: 1.35 mass %).

Component (a2): Dimethylpolysiloxane capped with dimethylvinylsiloxy groups at both ends of the molecule (number average molecular weight (Mn)=18000, number of dimethylsiloxane units=200) (mass fraction of vinyl groups per molecule: 0.4 mass %). Note that component (a2) does not correspond to component (A) of the present invention.

The following component was used as component (B).

Component (b1): Resin represented by the formula $((CH_2=CH)(CH_3)_2SiO_{1/2})_{0.1}((CH_3)_3SiO_{1/2})_{0.4}(SiO_{4/2})_{0.5}$ (weight average molecular weight (Mw)=5500 and number average molecular weight (Mn)=3000) (mass fraction of vinyl groups per molecule: 2.42 mass %).

The following component was used as the (C) component.

Component (c1): A dimethylsiloxane/methylhydrogensiloxane copolymer capped at both ends of the molecule with trimethylsiloxy groups (the mass fraction of silicon atom-bonded hydrogen atoms per molecule was 1.59 mass %, as based on the mass of the molecule).

The following components were used as component (D).

Component (d1): α-Alumina filler ($D_{50}$=0.4 µm; Advanced Alumina AA04 made by Sumitomo Chemical Co., Ltd.), Component (d2): α-Alumina filler ($D_{50}$=3 µm; Advanced Alumina AA3 made by Sumitomo Chemical Co., Ltd.).

The following component was used as component (E).

Component (e1): Silica nanoparticles treated with hexamethyl disilazane (HMDS) (Nippon Aerosil Co., Ltd., RDX200, primary particle having an average size of 12 nm).

The following component was used as component (F) (surface treatment agent).

Component (f1): Polydimethylsiloxane having the formula:

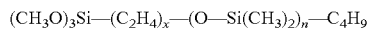

wherein n is 58 to 65 and x is 3.

The following component was used as component (G) (platinum group metal catalyst).

Component (g1): Pt catalyst (Pt-VTSC-3.0IPA made by Umicore Japan Co., Ltd.).

The following components were used as component (H) (curing inhibitor).

Component (h1): 1-Ethynyl-1-cyclohexanol (curing inhibitor 1) (mass fraction of vinyl groups per molecule when one ethynyl group is calculated as two vinyl groups: 43.56 mass %));

Component (h2): Methyl-tris(3-methyl-1-butyne-3-oxy) silane (JH-AkSi-1) (curing inhibitor 2) (mass fraction of vinyl groups per molecule when one ethynyl group is calculated as two vinyl groups: 55.57 mass %);

Component (h3): Tetramethyl tetravinyl cyclotetrasiloxane (curing inhibitor 3) (mass fraction of vinyl groups per molecule: 30.74 mass %).

The following components were used as component (J) (adhesion imparting agent).

Component (j1): A siloxane compound represented by the following formula

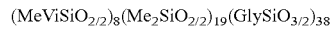

in the formula, Me represents a methyl group, Vi represents a vinyl group, and Gly represents a 3-glycidoxypropyl group (mass fraction of vinyl groups per molecule: 5.63 mass %).

The thermally conductive silicone compositions in the examples and comparative examples were prepared by the following procedure. Unless otherwise indicated, the amount of each component used in each step is the amount indicated in the tables.

Component (e1) (silica particles) and component (a1) (Vi polysiloxane) having a mass five times that of component (e1) (or component (a2) (Vi polysiloxane) in Comparative Example 4) were mixed in a dental mixer at 1600 rpm for 2 minutes.

The mixture obtained in step (i) was kneaded twice with a three-roll mill (ceramic three-roll mill NR-42A (made by Noritake)).

The mixture obtained in step (ii) was mixed with a Ross mixer (HIVIS MIX 2P-1, made by Primix).

Component (h3) (curing inhibitor 3) and component (c1) (H polysiloxane crosslinking agent) were added to the mixture obtained in step (iii), and mixed using a dental mixer at 1,600 rpm for 2 minutes.

The remaining amount of component (a1) (Vi polysiloxane) (or component (a2) (Vi polysiloxane) in Comparative Example 4) and component (b1) (Vi resin) used in step (i) were mixed with a dental mixer (ARV-310P, made by THINKY) at 1600 rpm for 2 minutes.

Component (f1) (surface treatment agent), component (d1) (alumina filler $D_{50}$=0.4 µm), and component (d2) (alumina filler $D_{50}$=3 µm) were added to the mixture obtained in step (v) and mixed in a dental mixer at 1600 rpm for 2 minutes. The resulting mixture was kneaded twice with a 3-roll mill (ceramic 3-roll mill NR-42A (made by Noritake)).

The mixture obtained in step (vi) was mixed with a Ross mixer (HIVIS MIX 2P-1, made by Primix).

Component (h1) (curing inhibitor 1) and component (h2) (hardening inhibitor 2) were added to the mixture obtained in step (vii) and mixed with a dental mixer at 1,600 rpm for 2 minutes.

Component (j1) (adhesion imparting agent) was added to the mixture obtained in step (viii) and mixed with a dental mixer at 1,600 rpm for 2 minutes.

Component (g1) (Pt catalyst) was added to the mixture obtained in step (ix) and mixed with a dental mixer at 1,600 rpm for 2 minutes.

The mixture obtained in step (iv) and the mixture obtained in step (x) were mixed with a dental mixer at 1,600 rpm for 2 minutes to obtain a thermally conductive silicone composition.

Table 1 and Table 2 show the parts by mass of each component used to produce the thermally conductive silicone compositions in the examples and comparative examples, the various ratios for each component, and the various properties of the thermally conductive silicone compositions and cured products thereof.

"SiH/Vi" in Table 1 and Table 2 represents [total number of moles of silicon atom-bonded hydrogen atoms]/[total number of moles of vinyl groups] in all of the components included in the thermally conductive silicone composition (where 1 mole of ethynyl groups in the compounds contained in the composition was added to the total number of moles of vinyl groups as 2 moles of vinyl groups). In examples 1 to 4 and comparative examples 1 to 3, 5, and 6, the number of silicon atom-bonded hydrogen atoms in component (C) with respect to a total of 1 mole of the silicon atom-bonded alkenyl groups (that is to say, vinyl groups) in the components (A) and (B) was 5.39 moles.

"Pt (ppm)" in Table 1 and Table 2 represents parts by mass of elemental platinum in component (D) per 1,000,000 parts by mass of the thermally conductive silicone composition.

"Viscosity (1/s)" and "Viscosity (10/s)" in Table 1 and Table 2 respectively represent viscosities measured at 25° C. and a rotational speed of 1 s$^{-1}$ or a rotational speed of 10 s$^{-1}$.

"Filler content" in Table 1 and Table 2 is the total amount of component (d1) and component (d2) expressed in mass %, as based on the mass of the thermally conductive silicone composition.

"TI (1/10)" in Table 1 and Table 2 is the thixotropic index (TI) value determined according to the method described above.

"-" for a component in the compositions in Table 1 and Table 2 indicates that the component is not included in the composition.

For "stringing" and "chip drift" in Table 1 and Table 2, "O" indicates a pass, and "X" indicates a fail.

In Table 2, a "-" for Viscosity and Properties indicates that the item was not measured.

TABLE 1

|  |  |  |  | Example 1 | Example 2 | Example 3 | Example 4 |
|---|---|---|---|---|---|---|---|
| Components of the Composition (parts by mass) | (A) | (a1) | Vi polysiloxane (Mn = 8000) | 12.01 | 12.01 | 12.01 | 12.01 |
|  |  | (a2) | Vi polysiloxane (Mn = 18000) | — | — | — | — |
|  | (B) | (b1) | Vi resin | 5.15 | 5.15 | 5.15 | 5.15 |
|  | (C) | (c1) | H polysiloxane crosslinking agent | 3.60 | 3.60 | 3.60 | 3.60 |
|  | (D) | (d1) | alumina filler ($D_{50}$ = 0.4 μm) | 22.15 | 14.68 | 18.77 | 22.18 |
|  |  | (d2) | alumina filler ($D_{50}$ = 3 μm) | 51.33 | 58.80 | 43.50 | 51.33 |
|  | (E) | (e1) | silica particles | 0.90 | 0.90 | 0.90 | 2.21 |
|  | (F) | (f1) | surface treatment agent | 0.94 | 0.94 | 0.94 | 0.94 |
|  | (G) | (g1) | Pt catalyst | 0.05 | 0.05 | 0.05 | 0.05 |
|  | (H) | (h1) | curing inhibitor 1 | 0.13 | 0.13 | 0.13 | 0.13 |
|  |  | (h2) | curing inhibitor 2 | 0.04 | 0.04 | 0.04 | 0.04 |
|  |  | (h3) | curing inhibitor 3 | 2.58 | 2.58 | 2.58 | 2.58 |
|  | (J) | (j1) | adhesion imparting agent | 0.88 | 0.88 | 0.88 | 0.88 |
|  |  |  | total (parts by mass) | 98.75 | 99.75 | 88.54 | 101.06 |
| Component Ratio and Viscosity |  |  | SiH/Vi | 1.28 | 1.28 | 1.28 | 1.28 |
|  |  |  | Pt(ppm) | 5.0 | 5.0 | 5.0 | 5.0 |
|  |  |  | filler content (%) | 73.7% | 73.7% | 70.3% | 72.7% |
|  |  |  | viscosity (1/s) (Pa s) | 14.3 | 16.5 | 9.15 | 48.6 |
|  |  |  | viscosity (10/s) (Pa s) | 6.7 | 8.2 | 4.3 | 15.5 |
|  |  |  | TI(1/10) | 2.13 | 2.01 | 2.13 | 3.14 |
| Properties |  |  | stringing | O | O | O | O |
|  |  |  | chip drift | O | O | O | O |
|  |  |  | adhesive strength (g/chip) | 623 | 667 | 604 | 576 |
|  |  |  | thermal conductivity (W/mK) | 1.20 | 1.21 | 1.03 | 1.15 |

TABLE 2

|  |  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Components of the Composition (parts by mass) | (A) | (a1) | Vi polysiloxane (Mn = 8000) | 12.01 | 12.01 | 12.01 | — | 12.01 | 12.01 | 21.14 |
|  |  | (a2) | Vi polysiloxane (Mn = 18000) | — | — | — | 20.00 | — | — | — |
|  | (B) | (b1) | Vi resin | 6.15 | 6.16 | 5.15 | — | 5.15 | 5.15 | 0.00 |
|  | (C) | (c1) | H polysiloxane crosslinking agent | 3.60 | 3.60 | 3.60 | 2.99 | 3.60 | 3.60 | 3.60 |
|  | (D) | (d1) | alumina filler ($D_{50}$ = 0.4 μm) | 7.35 | 29.39 | 18.20 | 22.15 | 22.15 | 22.15 | 22.15 |
|  |  | (d2) | alumina filler ($D_{50}$ = 3 μm) | 66.13 | 44.09 | 42.40 | 51.33 | 51.33 | 51.33 | 51.33 |
|  | (E) | (e1) | silica particles | 0.90 | 0.90 | 0.90 | 0.90 | 0.00 | 4.00 | 0.90 |
|  | (F) | (f1) | surface treatment agent | 0.94 | 0.94 | 0.94 | 0.94 | 0.94 | 0.94 | 0.94 |
|  | (G) | (g1) | Pt catalyst | 0.05 | 0.05 | 0.05 | 0.05 | 0.05 | 0.05 | 0.05 |
|  | (H) | (h1) | curing inhibitor 1 | 0.13 | 0.13 | 0.13 | 0.13 | 0.13 | 0.13 | 0.13 |
|  |  | (h2) | curing inhibitor 2 | 0.04 | 0.04 | 0.04 | 0.04 | 0.04 | 0.04 | 0.04 |
|  |  | (h3) | curing inhibitor 3 | 2.58 | 2.58 | 2.58 | 2.58 | 2.58 | 2.68 | 2.58 |
|  | (J) | (j1) | adhesion imparting agent | 0.88 | 0.88 | 0.88 | 0.88 | 0.88 | 0.88 | 0.88 |
|  |  |  | total (parts by mass) | 99.75 | 99.75 | 86.87 | 101.99 | 98.85 | 102.81 | 103.74 |

TABLE 2-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Component Ratio and Viscosity | SiH/Vi | 1.28 | 1.28 | 1.28 | 1.28 | 1.28 | 1.28 | 1.28 |
|  | Pt(ppm) | 5.0 | 5.0 | 5.0 | 5.0 | 5.0 | 5.0 | 5.0 |
|  | filler content (%) | 73.7% | 73.7% | 69.8% | 72.0% | 74.3% | 71.5% | 70.5% |
|  | viscosity (1/s) (Pa·s) | 39.6 | 38.0 | 5.91 | — | 4.84 | 20< | 10.8 |
|  | viscosity (10/s) (Pa·s) | 18.4 | 17.6 | 2.48 | — | 4.52 | 20< | 5.5 |
|  | TI(1/10) | 2.15 | 2.16 | 2.38 | — | 1.07 | — | 2.16 |
| Properties | stringing | x | x | — | x | ○ | x | ○ |
|  | chip drift | ○ | ○ | x | ○ | x | ○ | ○ |
|  | adhesive strength (g/chip) | — | — | — | — | — | — | 452 |
|  | thermal conductivity (W/mK) | 1.20 | 1.20 | 0.94 | 1.12 | 1.23 | 0.93 | 1.09 |

On the basis of the results in Examples 1 to 4, the thermally conductive silicone composition of the present invention produces an advantageous effect in that, while a high thermal conductivity of 1.0 W/m·K or more and a high adhesive strength of 550 g/chip or more are achieved, stringing of the thermally conductive silicone composition when used in the pin transfer process can be prevented and chip drift after the chip is mounted can be prevented.

Meanwhile, as shown in Comparative Examples 1 and 2, when the mass ratio of the first collection of heat dissipating filler powder and the second collection of heat dissipating filler powder in component (D) is outside the range of the present invention (1:9 in Comparative Example 1 and 4:6 in Comparative Example 2), stringing was pronounced when transferring, in the pin transfer process.

As shown in Comparative Example 3, when the content of component (D) was outside the range of the present invention, chip drift was observed.

As shown in Comparative Example 4, when the molecular weight of component (A) organopolysiloxane was 18,000, stringing was pronounced when transferring, in the pin transfer process.

As shown in Comparative Example 6, when the content of the silica particles of the component (E) exceeded the range of the present invention (3.9 mass %), stringing was pronounced when transferring, in the pin transfer process. Further, as shown in Comparative Example 5, when the content of the silica particles of component (E) was less than the range of the present invention (0 mass %), chip drift was observed.

As shown in Comparative Example 7, when the thermally conductive silicone composition of the present invention did not include component (B), the adhesive strength was insufficient (452 g/chip).

INDUSTRIAL APPLICABILITY

The thermally conductive silicone composition of the present invention can be used as a die-bonding material for LED chips in pin transfer processes and the like.

What is claimed is:

1. A thermally conductive silicone composition comprising the following components (A) to (F):
(A) a straight-chain organopolysiloxane having at least two silicon atom-bonded alkenyl groups per molecule, not having a silicon atom-bonded alkoxy group, and having a number average molecular weight of no greater than 10,000, in an amount of 50 to 90 parts by mass with respect to a total of 100 parts by mass of components (A) and (B);
(B) an organopolysiloxane resin represented by the following formula (I)

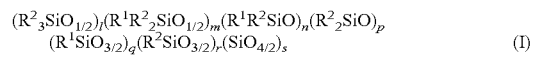

$(R^2{}_3SiO_{1/2})_l(R^1R^2{}_2SiO_{1/2})_m(R^1R^2SiO)_n(R^2{}_2SiO)_p$
$(R^1SiO_{3/2})_q(R^2SiO_{3/2})_r(SiO_{4/2})_s$ (I)

wherein $R^1$ independently represents an alkenyl group and $R^2$ independently represents an unsubstituted or substituted monovalent hydrocarbon group that does not include an addition-reactive carbon-carbon double bond, provided that at least 80 mol % of all the $R^2$ are methyl groups and l, m, n, p, q, r, and s are respectively numbers satisfying l≥0, m≥0, n≥0, p≥0, q≥0, r≥0, and s≥0, wherein m+n+q≥0, q+r+s≥0, and l+m+n+p+q+r+s=1 is satisfied, in an amount of 10 to 50 parts by mass with respect to a total of 100 parts by mass of components (A) and (B);
(C) an organohydrogenpolysiloxane having at least two silicon atom-bonded hydrogen atoms per molecule and a number average molecular weight of no greater than 10,000, in an amount such that the number of silicon atom-bonded hydrogen atoms in component (C) is 0.1 to 15 moles with respect to a total of 1 mole of the silicon atom-bonded alkenyl groups in component (A) and the silicon atom-bonded alkenyl groups in component (B);
(D) a heat dissipating filler, said heat dissipating filler being a heat dissipating filler mixture of a first collection of heat dissipating filler powder having an average particle size of no less than 0.2 μm but less than 1 μm, and a second collection of heat dissipating filler powder having an average particle size of no less than 2 μm but less than 20 μm, wherein the mass ratio of the first collection of heat dissipating filler powder to the second collection of heat dissipating filler powder is 3:7 to 2:8, in an amount of 70.0 mass % or more, as based on the total mass of the thermally conductive silicone composition;
(E) silica particles wherein the primary particles have an average particle size of less than 1 μm, in an amount of 0.1 to 3 mass %, as based on the total mass of the thermally conductive silicone composition; and
(F) a straight-chain organopolysiloxane having a silicon atom-bonded alkoxy group at one or both ends of the molecular chain, in an amount of 0.5 to 20 parts by mass with respect to a total of 100 parts by mass of component (A) and component (B).

2. The thermally conductive silicone composition according to claim 1, wherein the $D_{10}$ of the first collection of heat dissipating filler powder having an average particle size of no less than 0.2 μm but less than 1 μm is greater than the $D_{90}$ of the primary particles in the silica particles.

3. The thermally conductive silicone composition according to claim 1, wherein the heat dissipating filler consists of α-alumina particles.

4. The thermally conductive silicone composition according to claim 1, wherein the thermally conductive silicone composition has a viscosity of no greater than 20 Pa·s at a temperature of 25° C. and a rotational speed of 10 s$^{-1}$.

5. The thermally conductive silicone composition according to claim 1 for use in a pin transfer process, said process comprising the steps of:
   providing a transfer pin having a tip;
   providing a material reservoir containing the composition;
   inserting the tip of the transfer pin into the material reservoir so as to deposit the composition on the tip of the transfer pin;
   moving the transfer pin such that the tip having the composition deposited thereon is removed from the material reservoir;
   moving the transfer pin such that the tip having the composition deposited thereon is above a surface to be coated; and subsequently
   moving the transfer pin toward the surface to be coated and depositing the composition deposited on the tip onto the surface to be coated.

* * * * *